Aug. 29, 1939.   W. S. GRAHAM ET AL   2,171,031
TRACTOR IMPLEMENT
Filed Dec. 30, 1937   4 Sheets-Sheet 1
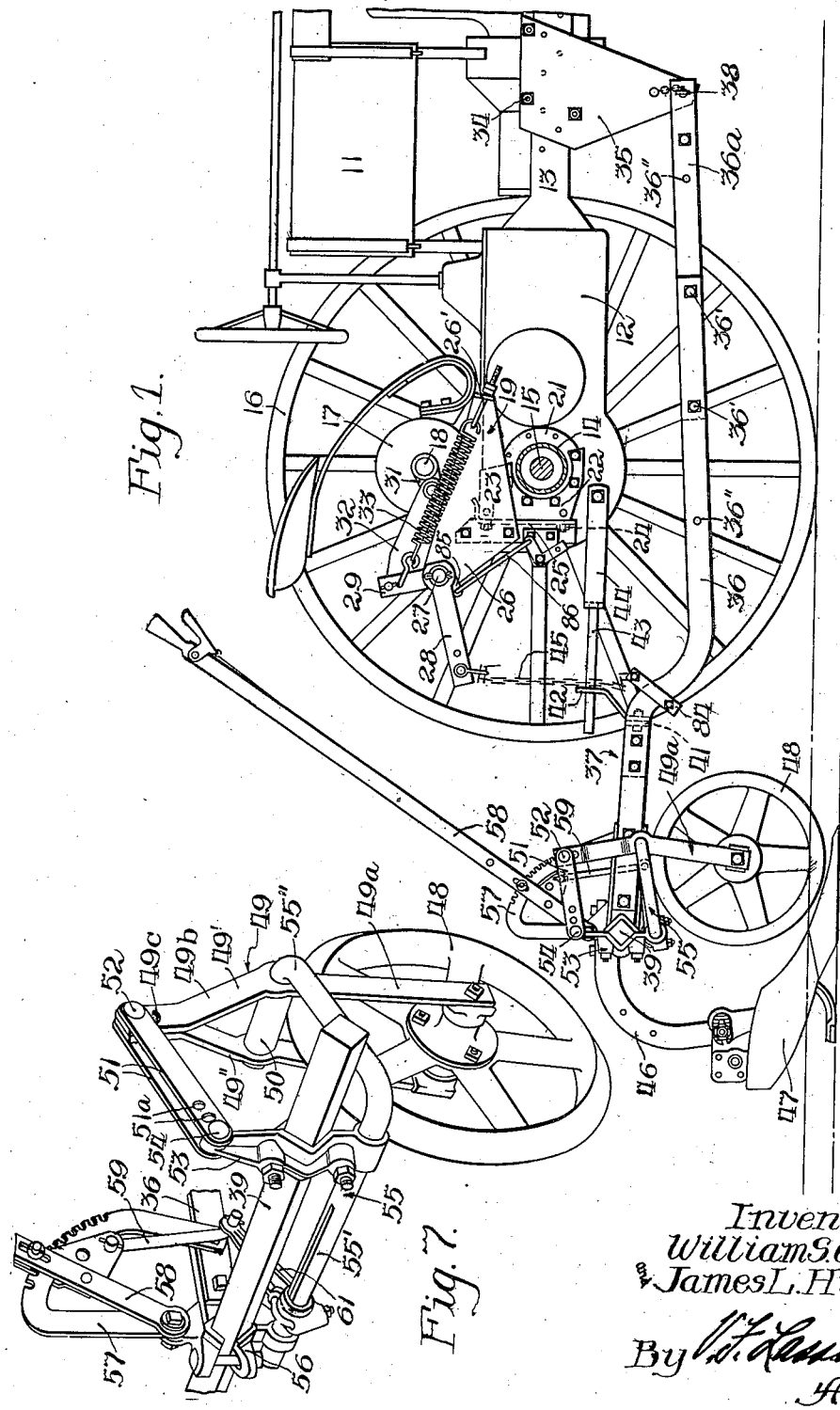
Inventors.
William S. Graham
& James L. Hipple
By [signature]
Atty.

Aug. 29, 1939.    W. S. GRAHAM ET AL    2,171,031
TRACTOR IMPLEMENT
Filed Dec. 30, 1937    4 Sheets-Sheet 2
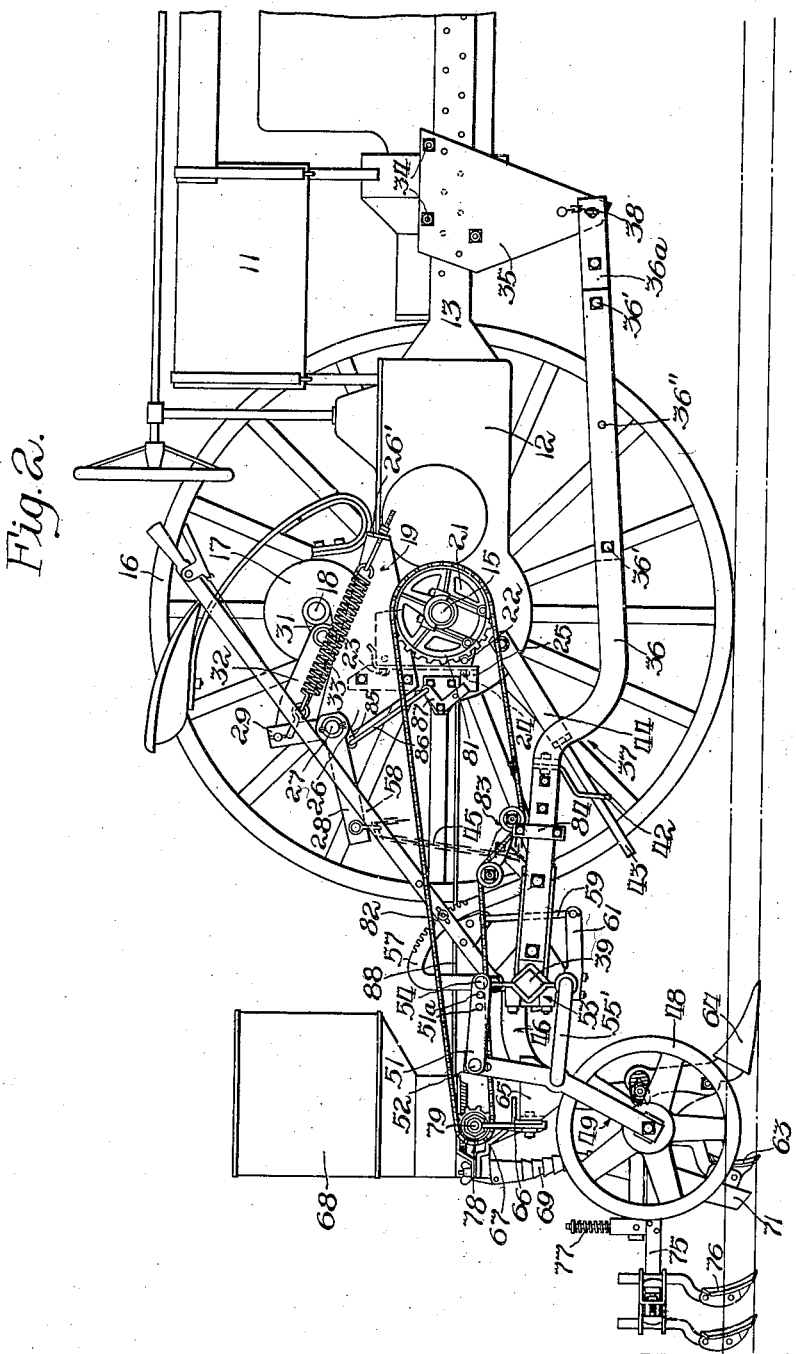
Inventors
William S. Graham & James L. Hipple
By [signature]
Atty.

Aug. 29, 1939.   W. S. GRAHAM ET AL   2,171,031
TRACTOR IMPLEMENT
Filed Dec. 30, 1937   4 Sheets-Sheet 3
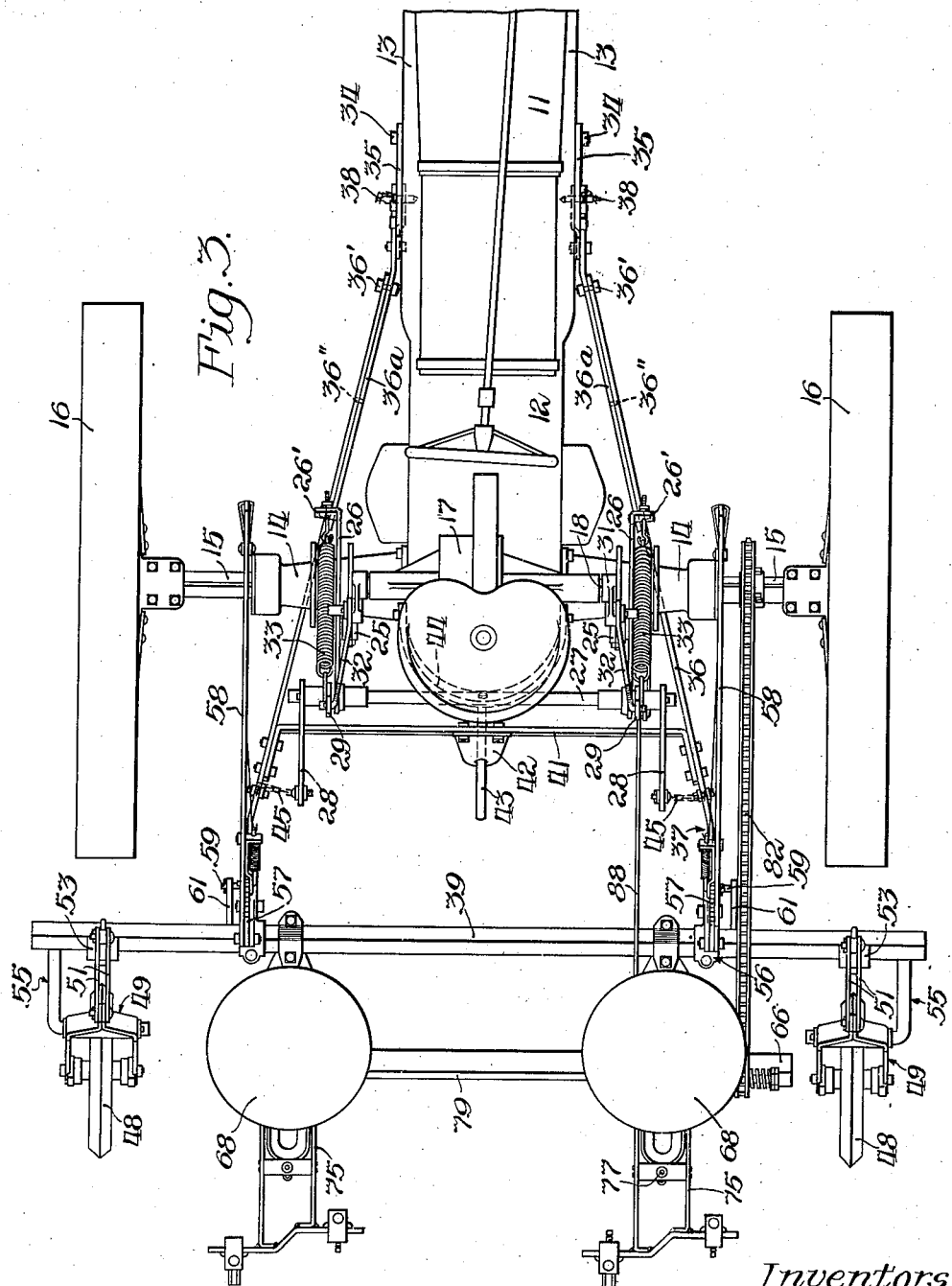

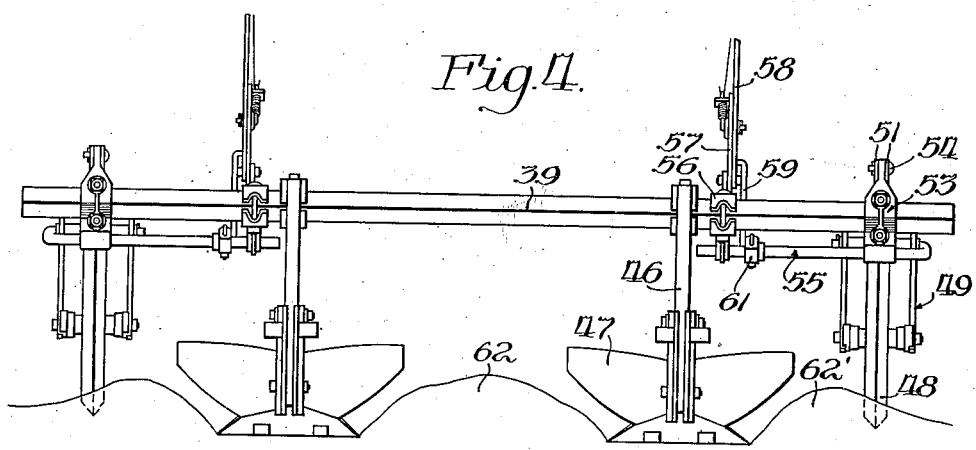
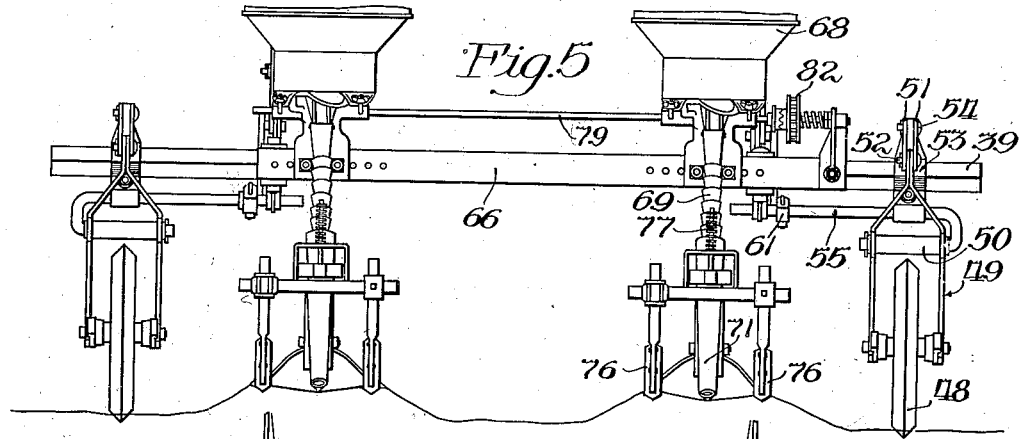
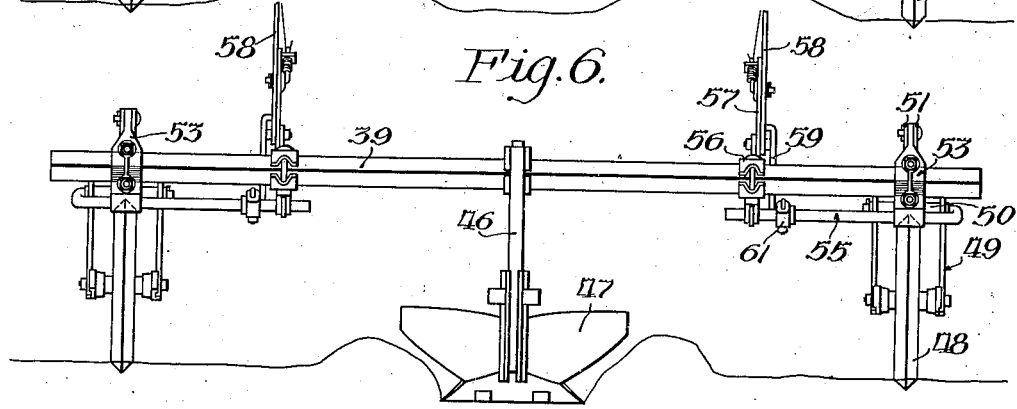

Patented Aug. 29, 1939

2,171,031

UNITED STATES PATENT OFFICE 2,171,031

TRACTOR IMPLEMENT

William S. Graham and James L. Hipple, Canton, Ill., assignors to International Harvester Company, a corporation of New Jersey Application December 30, 1937, Serial No. 182,459

15 Claims. (Cl. 97—47)

This invention relates to direct connected tractor implements, and more particularly to tractor implements of the tool bar type on which are attached working tools of one kind or another, varying somewhat in weight and selected according to the particular farm operation to be performed.

An implement of this type is pivotally connected to the under portion of the tractor and has to extend rearwardly of the tractor wheels in order that its tool bar may extend laterally or transversely to give sufficient length to place on the same enough tools to operate on several rows at a time. When the tools are placed on the tool bar and the implement frame is lifted by means on the tractor to a transport position, the tendency is for the rear mounted implements, due to their weight, to lift the front wheels of the tractor off the ground. Hence, there is a limit as to where the transverse tool bar may best be located rearwardly of the rear wheels of the tractor. If the location is not properly selected, the implements of greater weight, for instance, planter tools with their hopper boxes filled with seeds, may be sufficiently heavy to raise the forward end of the tractor when attempting to lift the tools out of their ground working position.

One thing which must be kept in mind is as to the locating of the gauge wheels, which are also attached like the tools themselves, to the tool bar. For instance, if lister plows are being used, it is highly desirable that the gauge wheels have a position forward of the tool bar to be in transverse alinement with the points of entrances of the lister plow bottoms and to follow in the tracks left by the rear wheels of the tractor in order that the most effective gauging of the plowing depth may be obtained. With the long crank axles used heretofore for mounting of the gauge wheels, the gauge wheels are thrown out of transverse alinement with the working tools upon adjusting for depth. To arrange such cranks parallel with the frame to have the gauge wheels follow the tractor wheels has not heretofore appeared possible since it would require the implement to be moved considerably rearwardly of the tractor wheels and thus tend to upset the tractor upon being lifted.

When planter tools are substituted for the lister plow bottoms on the transverse tool bar, another problem arises relative to properly locating the gauge wheels for proper planting. If the wheels are permitted to remain forward of the transverse tool bar when the seeds are dropping from a location rearward of the transverse tool bar, any small rise or depression in the ground over which the gauge wheel travels causes a large deflection out at the point where the seeds are being planted, thus causing the seeds to be planted too shallow or too deep.

It is, therefore, the principal object of this invention to provide an implement of the tool bar type which is particularly adapted for carrying tools of different weights.

It is another object of this invention to provide an implement of the tool bar type, in which the gauge wheels may be set at a variety of locations forwardly or rearwardly of the tool bar, depending upon the particular type of tool being used.

It is another object to provide an implement of the tool bar type in which, once the gauge wheel is positioned, this adjustment of the same forwardly or rearwardly of the tool bar will be substantially maintained when the wheel is being adjusted for gauging the working depth of the working tools.

It is still another object of the invention to provide an implement of the tool bar type, in which the gauge wheels carried by the bar follow in the tracks left by the rear wheels of the tractor.

In general, the invention comprises an implement frame of the tool bar type having the usual transverse tool bar and longitudinal members extending under the tractor and pivoted at a point forwardly of the rear wheels of the same. When the frame is attached to the tractor, the transverse tool bar spans the tractor wheels and is permitted to have up and down movement without interference from the tractor wheels. Means is provided whereby the implement frame may have two locations longitudinally of the tractor, one when implements of one weight, such as lister plows, are used; and another position when implements of another weight, such as planter tools, are used. When the lister plows are used, the transverse frame may be located at a greater distance from the tractor wheels to allow for the location of the gauge wheels not only forward and in a position for the most effective gauging of the points of entrances of the plow bottoms into the soil, but also to follow in a path left by the tractor wheels. In order to provide for the proper adjustment of the wheels relative to these points of entrances of the lister tools, the mounting means for the gauge wheels includes a variety of adjusting means. The mounting means also is made so as to give a parallel motion upon raising or lowering of the wheels, so that, once the gauge wheels are set in their proper position, the longitudinal distance between a vertical plane through the axis of the wheel and a vertical plane through the tool bar is always maintained, the parallel members thereof running substantially horizontally with the implement frame.

When the implement frame is to be converted into a planter implement, the same may be moved forwardly to compensate for the tendency that these tools of greater weight would otherwise have to raise the front wheels of the tractor out of the ground. In this positioning of the implement frame, the gauge wheels may be reassembled to follow in trailing relation in rear of the transverse tool bar and also may be properly adjusted for transverse alinement with the point to which the ground is opened for the dropping of seeds.

For other objects and for a better understanding of the invention, reference may be had to the following detailed description taken in connection with the accompanying drawings, in which:

Figure 1 is an elevational view of part of a tractor with a rear wheel removed and with the implement embodying the present invention connected thereto;

Figure 2 is an elevational view of the tractor, showing the implement of the present invention as adapted for planting operations;

Figure 3 is a plan view of the tractor and the implement adapted for planting;

Figure 4 shows the transverse tool bar with lister plows attached thereto and gauge wheels arranged for the initial lister plowing;

Figure 5 shows the arrangement of planter mechanisms on a transverse tool bar for planting on the ridges previously formed by the arrangement shown in Figure 4;

Figure 6 is a view similar to Figure 4, showing the use of but one lister plow attached to the transverse tool bar; and, Figure 7 is an enlarged perspective view, showing the attachment of the gauge wheel and its adjusting mechanism to the transverse bar.

In the figures, there is shown a tractor 11 having a transmission and differential housing 12, side frames 13, and laterally extending housings 14 on the transmission housing 12, through which extend rear axles 15, to which are connected rear drive wheels 16 of the tractor. Mounted on the transmission 12 is a power lift actuating device 17 which has a laterally extending rockshaft 18, from which power is transmitted to a lifting mechanism generally indicated at 19 mounted on the tractor rearwardly thereof.

On the axle housing 14, there are provided flanged portions 21, to which are attached at each side thereof vertically extending plates 22 having the usual attachable swing bolts 23 and 24. To these plates, there may be attached the lifting mechanism structure 19, which comprises in general vertically extending bracket members 25 having the usual slots at their top and bottom adapted to receive, respectively, the swing bolts 23 and 24, and at the upper ends thereof, there are respectively attached rearwardly and forwardly extending plate members 26. At the rear ends of these plates, there is rotatably mounted a rock-shaft member 27 carrying rearwardly extending lift arms 28 and operating arms 29 adapted to be connected to crank members 31 on the rock-shaft 18 of the power lift device by means of pitmans 32. The power lift device is preferably of the type in which the crank arm 31 is rocked to and fro thereby giving a rocking movement to the rockshaft 27 and lift arms 28 of the lifting mechanism. This power lift device 17 and the lift mechanism 19, therefore, comprise means on the tractor for raising and lowering the implements connected thereto. By merely unloosening these swing bolts 23 disconnecting the pitmans 32, the lift mechanism 19 may be detached from the tractor as a unit.

To assist the power lift device 17 in its lifting operation, there is provided a helper spring 33 connected between a flanged portion 26' on the plate member 26 and the operating arm 29. When the crank arm 31 is rotated to a certain over-center position, the helper spring 33 comes into play to provide additional pull on the operating arm 29.

Mounted on the side sills 13 of the tractor and adapted to be easily attached thereto by means of hook bolts 34 are downwardly extending hitch plates 35. Connected to these hitch plates 35 are longitudinally extending beam members 36 of an implement carrying frame 37. These members are adapted for easy attachment to the hitch plates by means of pivot pins 38. The frame 37 further consists of a transversely extending tool bar member 39, which is connected at the rear ends of the members 36 and extends a substantial distance outside of the tractor wheels. The frame 37 is further made rigid by a transversely extending member 41 interconnecting the longitudinal members 36 forward of the transverse member 39.

To this transversely extending member 41 is attached an upwardly extending member 42 midway between the two longitudinal members 36, having a hole therein through which is extended a projection 43 of a stabilizer 44 connected to the transmission housing 12 at each side thereof and adapted to have free vertical pivoting movement. This stabilizer tends to keep the frame 37 in proper lateral position relative to the tractor at all times.

Connecting the frame 37 with the lift arms 28 are lifting chains 45. Thus, when the lifting mechanism 19 is operated, the frame 37 will be pivoted about the pivot pins 38 to be lifted or lowered relative thereto.

The tool bar 39 is adapted to have connected thereto stub beams 46 adapted to carry working tools or lister plow bottoms 47 at their ends. In the Figures 1, 4 and 6, there is shown the transverse bar 39 arranged with tools 47 for a lister plowing operation. Mounted also on the tool beam 39 is the mounting means for the mounting of gauge wheels, or frame supporting means, 48. These gauge wheels, when used in connection with the lister plows, are arranged to extend forwardly of the transverse tool bar and adapted to follow immediately in rear of the rear wheels 16 of the tractor. The gauge wheels 48, for the best location, should be located in transverse alinement with the points of entrances of the lister plows.

Once the wheels are set at their proper locations and in transverse alinement with the points of entrances of the plow bottoms 47, for the best operation of the same, it is desirable that this alinement be maintained even while the gauge wheels are being adjusted to vary the working depth of the lister plow bottoms. To this end, there has been provided a mounting means which gives to these wheels a parallel motion on being adjusted. To provide means for maintaining this transverse alinement and in accordance with the present invention the wheels 48 are mounted in a holder 49 having the portion 49a which carries the wheel 48 at an angle with an upper portion 49b.

This holder takes the form of a straddling fork and consists of two side plates 49' and 49", which are held in their spaced relation by a sleeve portion 50 welded to the same (Figure 7) and joined together at their upper ends to provide for connection of links 51. This upper end portion 49b may have a plurality of holes 49c, through which the bolt 52 may be placed to connect the links 51. By having two of such holes 49c, there is provided a means for adjustment, which will be hereinafter explained.

Mounted on the transverse bar 39 is clamped at any location therealong a bracket 53 having portions extending above and below the transverse bar. On the portion above the transverse bar, the links 51 may be attached by means of a bolt 54. The links 51 have a plurality of holes 51a to provide further adjustment for the setting of the gauge wheels 48.

To the portion of the bracket 53 below the transverse bar 39, there is rotatably mounted a crank arm 55 which has a portion 55' extending lengthwise of the transverse bar 39 and a crank portion 55'' extending substantially parallel to the frame member 36 to a point spaced from the transverse bar 39 and so bent as to receive the sleeve portion 50 of the holder 49. The holder 49 may rotate on this bent portion and is removable therefrom. The portion 55' of the crank 55 is further supported along the transverse bar 39 by a clamp bracket 56, which carries a part of an adjustable segment 57 and lever 58. The lever 58 is connected by means of a link 59 to an arm 61, rigidly connected to the portion 55' of the crank arm 55. It can be seen, by an adjustment of the lever 58, that the gauge wheel 48 can be raised and lowered relative to the lister plow bottom 47 to change the working depth of the same. Due to the link 51, this movement of the wheel 48 is that of a straight line movement, thus maintaining the vertical alinement at all times with the lister plows 47, once the proper adjustment into transverse alinement has been made.

To effect the alinement of the gauge wheels with the lister bottoms 47, both of the means already referred to may be used. An adjustment of the links 51, relative to the bracket 53, by having the bolt 54 inserted through any of the holes 51a and by having the bolt 52 placed through any of the holes 49c in the holder 49, will give a certain range of forward and rearward adjustment of the gauge wheel 48. There is also provided a further means of adjustment, and that is the adjustment which is effected by reversing the holder 49 on the bent part of the crank portion 55'' of the crank arm 55. By removal of the bolt 52 and links 51, the holder 49 may be removed from the crank arm and reversed, so that the upper portion 49b will extend forwardly of the portion 49a. The holder and the wheel are removed and turned around so that the side plate 49'' of the holder 49 will be on the outside.

The operation performed with the lister plow bottoms arranged, as just explained, is best illustrated in Figure 4. The lister plows 47 are so adapted as to run two furrows under the old corn or cotton stalks that have been left by the previous year's planting, and the dirt is piled in ridges, as at 62. The gauge wheels are adjusted to run outside of the plow bottoms, but in transverse alinement therewith, on the solid ground and in the tracks left by the tractor wheels. By having the adjustment of the wheels forward of the transverse bar and of the moldboards 48' of the lister plows 47, the gauge wheels will not receive dirt thrown out by the moldboards 47, since the dirt 62', constituting one-half of a ridge, will be thrown in the rear of the wheels. These ridges are left to stand by the farmer throughout the winter and will absorb considerable moisture.

In the spring of the year, when the planting operation is to be made, the implement frame will be given a different adjustment on the tractor. Since the planting equipment on the tool bar, particularly when filled with seed, weighs more than the lister plow equipment, it is desirable, for reasons aforementioned, that this equipment be moved forward on the tractor. The frame member 37, in accordance with the present invention, has its longitudinal members 36 made in two parts. They include members 36a, which may be attached to the main portion of the members in different longitudinal locations. These members 36a are connected to the main members 36 by means of bolts 36' when it is desired to adjust the frame forwardly to adapt the same for a planting operation, the bolts 36' are removed, the frame is advanced forwardly, and the bolts are applied in different holes 36'' in both of the members. While this is just one means of making a longitudinal adjustment of the frame, it should be understood that other means may be perfected to give this same effect. For instance, a series of holes may be located in the members 36, which can be alined with the plates 35 and held attached thereto by the pins 38. Also, the plate 35 can be adjustable along the side rails 13 of the tractor.

Since the transverse frame is moved forward for planting, the gauge wheels 48, in order not to interfere with the tractor wheels, necessarily have to be located in rear of the transverse bar. This is no disadvantage, since, for the best planting operation, these wheels should be arranged in transverse alinement with the planter furrow openers 63. This change over of the gauge wheel is easily effected by removing the holder 49, reversing the position of the crank 55, and then reassembling the holder and links 51 on the crank 55. The arms 61 will have to be unloosened to permit rotation of the crank arm 55.

The stub beams 46 are permitted to remain on the transverse bar, and sweep tools 64 are mounted at their lower ends in place of the lister bottoms 47. On the rear of the stub beams are mounted brackets 65 to which is attached a transversely extending angle member 66, on which is supported the bracket 67 for carrying the seed hoppers 68. The seed is permitted to drop from the seed hoppers 68 through a funnel 69 and conduit 71 into the furrow left by the furrow opener 63. Mounted for pivoted movement on the stub beams 46 and trailing therebehind is a pivoting arm 75 having the covering shovels 76 for covering the seed which has previously been dropped through the conduit 74. The shovels 76 are restrained to their ground engaging position by a pressure spring 77.

Usual driving mechanism 78 is provided for each of the hoppers and includes a rotatable shaft 79 extending between the driving mechanisms for each of the hoppers, as well as the usual clutch mechanism used with driving mechanism of this type. The driving mechanism receives its power from a sprocket 81 mounted on the rear axle of the tractor by means of a chain 82, which runs over tightening rollers 83 carried on a bracket 84 on the frame 36. On the rock-shaft 27 is an arm 85 to which is connected a link 86, the lower end of which connects with a bell crank 87 mounted for pivotal movement on the member 25. The other end of this bell crank is connected by means of a link 88 to the clutch of the planter drive mechanism. When the rock-shaft 27 is rotated to lift the implement frame 36, the arm 85 is also rotated, and the clutch of the driving mechanism will be thrown out to automatically disconnect the seed drive mechanism.

The planters are arranged laterally along the transverse bar, as best shown in Figure 6, so that planting will be effected on the ridges 62, previously formed. It is customary in planting on these ridges to sweep off a portion of the dirt previously thrown up by the lister operation by means of the sweep plows 64, in order that the seed will be planted in a relatively moist body of the soil. The furrow opener 63 follows the sweep plows 64 and forms a furrow for dropping of the seed.

By having the wheels 48 in transverse alinement with the seed planters, a more effective planting depth is maintained. Also, by having the same follow in the tracks left by the tractor wheels, a more effective and level ground for the gauge wheels to run over is obtained. By the mounting means of the present invention, this location of the gauge wheels can be easily effected. Also, when once the wheels are alined with tools by the provisions for adjustment already described, the gauge wheels 48 will always keep their transverse alinement when depth adjustment is made.

It should now be apparent from the foregoing that an implement of the tool bar type, which is more readily adaptable for different working tools, has been provided. While various changes in the details of the structure shown may be made, it shall be understood that such changes shall be within the spirit and scope of the invention as defined in the appended claims.

What is claimed is:

1. In combination, a tractor, an implement frame directly connected to the tractor, depth gauge wheel means for supporting the frame in its ground position, said frame being of the type adapted for the attachment of different kinds of working tools, each kind of tool requiring a different transverse setting of the gauge wheel means, and means for mounting the gauge wheel means in a plurality of positions longitudinally of the frame for adjustment into transverse alinement with the particular working tool being used including means for maintaining the transverse alinement of the gauge wheel means upon depth adjustment of the same.

2. In combination, a tractor, an implement frame directly connected to the tractor and being of the transverse tool bar type adapted for the attachment of different kinds of working tools, a depth gauge wheel for supporting the frame in its ground position, each of the different kinds of working tools requiring a different transverse setting of the gauge wheel, means for mounting the gauge wheel on the tool bar in a plurality of positions longitudinally of the frame for adjustment into transverse alinement with the particular working tool being used including means for maintaining the transverse alinement of the gauge wheel upon depth adjustment of the same.

3. In combination, a tractor, an implement frame directly connected to the tractor and being of the transverse tool bar type adapted for the attachment of different kinds of working tools, a depth gauge wheel for supporting the frame and tools in their ground position, each of the different kinds of working tools requiring a different transverse setting of the gauge wheel, and means for mounting the gauge wheel on the tool bar in a plurality of positions longitudinally of the frame for adjustment into transverse alinement with the particular working tool being used including a reversible holder means to which the wheel is directly attached having a portion thereof at an angle with another portion.

4. In combination, a tractor, an implement frame directly connected to the tractor and being of the transverse tool bar type adapted for the attachment of different kinds of working tools, depth gauge wheel means for supporting the frame and tools in their ground position, each of the different kinds of working tools requiring a different transverse setting of the gauge of the gauge wheel means, and means for mounting the gauge wheel means on the tool bar in a plurality of positions longitudinally of the frame for adjustment into transverse alinement with the particular working tool being used including a holder to which the wheel means is directly attached, a connecting link, and said holder having means for attaching the link at a plurality of locations thereon.

5. In combinatiton, a tractor, an implement frame directly connected to the tractor and being of the transverse tool bar type adapted for the attachment of different kinds of working tools, a depth gauge wheel for supporting the frame and tools in their ground position, each of the different kinds of working tools requiring a different transverse setting of the gauge of the gauge wheel, and means for mounting the gauge wheel on the tool bar in a plurality of positions longitudinally of the frame for adjustment into transverse alinement with the particular working tool being used including a holder to which the wheel is directly attached, a connecting link between the holder and the tool bar, and said link having means for attachment at a plurality of locations.

6. In combination, a tractor having rear wheels, an implement frame adapted to have selected working tools of different kinds and weights attached to the tractor for movement with respect thereto, means for adjusting the frame forwardly on the tractor when tools of greater weight are used, and supporting means for the frame and tools in their ground working position alined with the rear wheels and mounted for rearward adjustment thereon upon adjustment of the frame and tools forwardly on the tractor.

7. In combination, a tractor having rear wheels, an implement frame directly connected to the tractor and adapted to have working tools of different kinds and weights attached thereto, depending upon the working operation to be performed, means for adjusting the frame forwardly on the tractor when tools of greater weight are used, means for supporting the frame and tools in their ground working position adapted to follow in the tracks left by the tractor rear wheels, and adjustable means for locating the supporting means in proper transverse alinement with the working tools on the frame irrespective of the forward adjustment of the frame on the tractor.

8. In combination, a tractor having rear wheels, an implement frame mounted for vertical movement on the tractor comprising longitudinal members extending forwardly under the tractor and a transverse tool bar adapted for attachment of selected working tools of different weights and for attachment of adjustable gauge wheels to be in trailing alinement with the rear wheels of the tractor, means for so mounting said gauge wheels on the tool bar as to maintain substantially the longitudinal distance between a vertical plane through the axis of the wheels and a vertical plane through the tool bar upon adjustment of the gauge wheels, means for adjusting the frame forwardly on the tractor to render the same adaptable to the tractor for tools of greater weight, and said mounting means being adjustable on the tool bar to remain in trailing alinement with the rear wheels of the tractor but rearward of their original position.

9. In combination, a tractor, an implement frame directly connected to the tractor, working tools carried by the frame, depth gauge wheels for supporting the frame in its ground position, and means for mounting said gauge wheels including means for adjusting the gauge wheels longitudinally of the frame for transverse alinement with the working tools, and means for maintaining the transverse alinement upon depth adjustment of the gauge wheels.

10. In a ground-working implement, a frame, a working tool carried by the frame, depth gauge means in transverse alinement with the working tool, and means for mounting the gauge means in a plurality of positions longitudinally of the frame for adjustment into transverse alinement with the working tool including means for substantially maintaining the alinement of the gauge means upon depth adjustment of the same.

11. In a ground-working implement, a frame, a working tool carried by the frame, a depth gauge means in transverse alinement with the working tool, a holder means for the gauge means, and parallel links for connecting the holder to the frame to substantially maintain transverse alinement of the gauge means with the working tool upon adjustment of the gauge means.

12. In a ground-working implement, a frame, a working tool carried by the frame, a depth gauge means in transverse alinement with the working tool, a holder means for the gauge means, parallel links for connecting the holder to the frame to substantially maintain transverse alinement of the gauge means with the working tool upon adjustment of the gauge means, and means for adjusting the effective length of one of said links to obtain an initial transverse alinement of the gauge means with the working tool.

13. In a ground-working implement, a frame, a working tool carried by the frame, a crank axle mounted for adjustment with respect to the frame, a depth gauge wheel in transverse alinement with the working tool, and means for connecting the gauge wheel to the crank axle, comprising a holder pivotally mounted on the crank axle and a link connecting the holder with the frame to substantially maintain the transverse alinement of the wheel with the working tool upon adjusting the crank axle.

14. In a ground-working implement, a frame, a working tool carried by the frame, a crank axle on the frame, a depth gauge wheel, and a reversible holder means for connecting the gauge wheel to the axle having a portion thereof at an angle with another portion.

15. In a ground-working implement, a frame, a working tool carried by the frame, a crank axle on the frame, a holder pivotally mounted on the crank axle, a depth gauge wheel carried by the holder, and means for adjusting the holder on the crank axle to place the gauge wheel into transverse alinement with the working tool in its ground-working position.

WILLIAM S. GRAHAM.
JAMES L. HIPPLE.